United States Patent [19]
Corrie, Jr. et al.

[11] Patent Number: 5,495,571
[45] Date of Patent: Feb. 27, 1996

[54] METHOD AND SYSTEM FOR PERFORMING PARAMETRIC TESTING OF A FUNCTIONAL PROGRAMMING INTERFACE

[75] Inventors: Timothy D. Corrie, Jr., Redmond; Robert F. Day, Bothell; Kenneth S. Gregg, Redmond; John L. Miller, Bellevue; Sivaramakichenane Somasegar, Redmond, all of Wash.

[73] Assignee: Microsoft Corporation, Redmond, Wash.

[21] Appl. No.: 954,566

[22] Filed: Sep. 30, 1992

[51] Int. Cl.$^6$ .................................................. G06F 11/00
[52] U.S. Cl. ..................................... 395/183.14; 395/700
[58] Field of Search ................................... 395/575, 200, 395/375, 500, 700

[56] References Cited

PUBLICATIONS

"Microprocessors & Programmed Logic" by K. L. Short ©1987 by Prentice–Hall Inc. pp. 205–217.
*Computer Architecture and Organization*, Second Edition by John P. Hayes ©1988 McGraw–Hill book Co. pp. 535–537.

*Primary Examiner*—Vincent P. Canney
*Attorney, Agent, or Firm*—Seed and Berry

[57] ABSTRACT

The present invention provides a method and system for performing parametric testing of a functional programming interface. Parametric testing of a function verifies that the function performs as expected when a valid or an invalid parameter is passed to the function. To perform parameter testing on a function, the present invention receives as input prototype information for the function, and then formulates a testing plan. The invention tests the function according to the testing plan. The testing plan specifies a list of invalid and valid values for each parameter of the function. The invention repeatedly invokes the function, each time passing the function various combinations of invalid and valid values. The function passes the test when (1) the function does not return an error code for any combination of valid parameter values and (2) the function returns an error for any combination of parameter values that include an invalid parameter value.

14 Claims, 4 Drawing Sheets

METHOD AND SYSTEM FOR PERFORMING PARAMETRIC TESTING OF A FUNCTIONAL PROGRAMMING INTERFACE

TECHNICAL FIELD

This invention relates generally to a computer method and system for performing parametric testing of a functional programming interface, and, more particularly, to a method and system for testing the result of a function when the function is invoked with valid and invalid parameters.

BACKGROUND OF THE INVENTION

In a functional programming interface, all routines are provided as functions. Parameters are passed to a function to give values to variables that are used within the function. A variable is a named storage location capable of containing a certain type of data that can be modified during execution of the function. Each variable has a data type, which specifies the possible range of values for the variable, the operations that can be performed on the values, and the way in which the values are stored in memory.

To ensure that the correct data types are being used for a variable, a compiler can be used to perform type checking operations. For example, if a function requires two integers as parameters, but a calling program attempts to pass an integer and a floating point value to the function, then a compiler performing type checking would uncover the error. A compiler, however, is limited in the degree of parameter testing that it can perform. Suppose a function has a variable FileName as one of its formal parameters, and the variable FileName is defined as type character. A compiler would not verify that a valid file existed with the name FileName. A compiler would only check to see if the actual parameter is of type character.

During development of a function, it is important for the programmer to test the function to see how the function will behave with different input values as parameters. Oftentimes a function will behave incorrectly when an invalid parameter is passed to the function, thereby disrupting the normal program flow. Function tests are actually based on parameter types. To understand how parameter types interact with a function, consider the following function prototype:

BOOL FOOBAR (HWND hWindow, HICON hIcon);

The parameter types in this particular example are HWND (handle to a window), and HICON (handle to an icon). The function name is FOOBAR. A window handle would be a valid value for HWND, but a handle to a file or a handle to memory would be an invalid value.

Programmers perform parametric testing of functions to test how functions react to valid and invalid parameters. To perform parametric testing of a function in prior art systems, programmers write modules of test code to pass valid and invalid parameters to the function, and then observe the behavior of the function. If a valid parameter is passed to the function, then the function should execute without any problems. If an invalid parameter is passed to the function, then the function should return a proper error message or a return code.

The primary disadvantage of this approach is that the test code written by each programmer is not reused by other programmers testing the same parameters in different functions. Because programmers are each developing their own test code, duplication of code is unavoidable, resulting in considerable expenditure of time and effort. Also, with each programmer writing separate modules of code, it is difficult to be aware of each programmer's methodology of parametric testing.

Parametric testing is a time-consuming task. When testing all of the functions in the application programming interface to Microsoft Windows, for example, programmers must write modules of test code for approximately 1,000 functions, each function having on an average of 3–4 parameters. Additionally, each parameter has numerous valid and invalid values that need to be tested. It would be advantageous to have an automated method of parametric testing.

It would also be advantageous to have a method of parametric testing that would allow programmers to easily utilize work done by other programmers. The method of parametric testing should eliminate redundancies in test coding by allowing programmers to share uniformly-created test modules. By sharing test modules uniformly created by different programmers, an individual programmer could generate much more complete test coverage than using prevalent testing methods. The more complete coverage would result in more thorough testing of the functions in question. More thorough testing would save money by preventing expensive product updates to correct errors, and the high product quality ensured by the thorough testing would enhance a software product's reputation and marketability.

SUMMARY OF THE INVENTION

The present invention provides a method and system for performing parametric testing of a functional programming interface. In a preferred embodiment, the present invention verifies the validity of a function when various valid and invalid values are passed to the function as parameters. A script file, a function library, and a test utility are all used in this testing process. The script file contains prototype information for each function to be tested and a case specification for each parameter of the function. The prototype information includes a type identifier to identify the type of function, parameter information for identifying the parameters associated with the function by type and name, and alternatively, a return value to identify the expected output from the function when the function does not execute properly. The case specification includes case names for each parameter of the function, such that each case name represents a valid or an invalid value for that parameter.

The function library provides set-up and clean-up functions for each case name passed to the function. When invoked, a set-up function allocates resources to create a valid or an invalid value for a parameter, while a clean-up function allocates resources to destroy the corresponding valid or invalid value created by the set-up function.

The test utility coordinates the parametric testing of each function in the functional programming interface. The test utility reads the script file and generates a plurality of unique test cases. Each test case comprises a combination of case names, one case name for each parameter of the function. For each test case generated, the test utility invokes a set-up function to allocate resources to create each case name in the test case, invokes the function to be tested and passes the case names in the test case to the function as parameters, records the outcome of the function, and then invokes a clean-up function to allocate resources to destroy each case name in the test case.

DETAILED DESCRIPTION OF THE INVENTION

The present invention provides a method and system for performing parametric testing of a functional programming interface. Parametric testing of a function verifies that the function performs as expected when a valid or an invalid parameter is passed to the function.

For purposes of this description, an application programming interface (API) will be described as an example of a functional programming interface. An API is a set of functions that an application program uses, for example, to request lower level services performed by a computer's operating system. Parameters are passed to functions in the API by the application program. A parameter is a value that is given to a variable used by a function. Each parameter has a parameter type and a parameter name. A parameter type defines a set of data that specifies the possible range of values of the parameter, the operations that can be performed on the values, and the way in which the values are stored in memory. Examples of parameter types are integer, real number, handle to a file, handle to a window, text character, and so on. A parameter name is an arbitrary identifier given to a parameter by a programmer.

Overview. To perform parameter testing on a function, the present invention receives as input prototype information for the function, and then formulates a testing plan. The invention tests the function according to the testing plan. The testing plan specifies a list of invalid and valid values for each parameter of the function. The invention repeatedly invokes the function, each time passing the function various combinations of invalid and valid values. The function passes the test when (1) the function does not return an error code for any combination of valid parameter values and (2) the function returns an error for any combination of parameter values that include an invalid parameter value.

Figure 1:
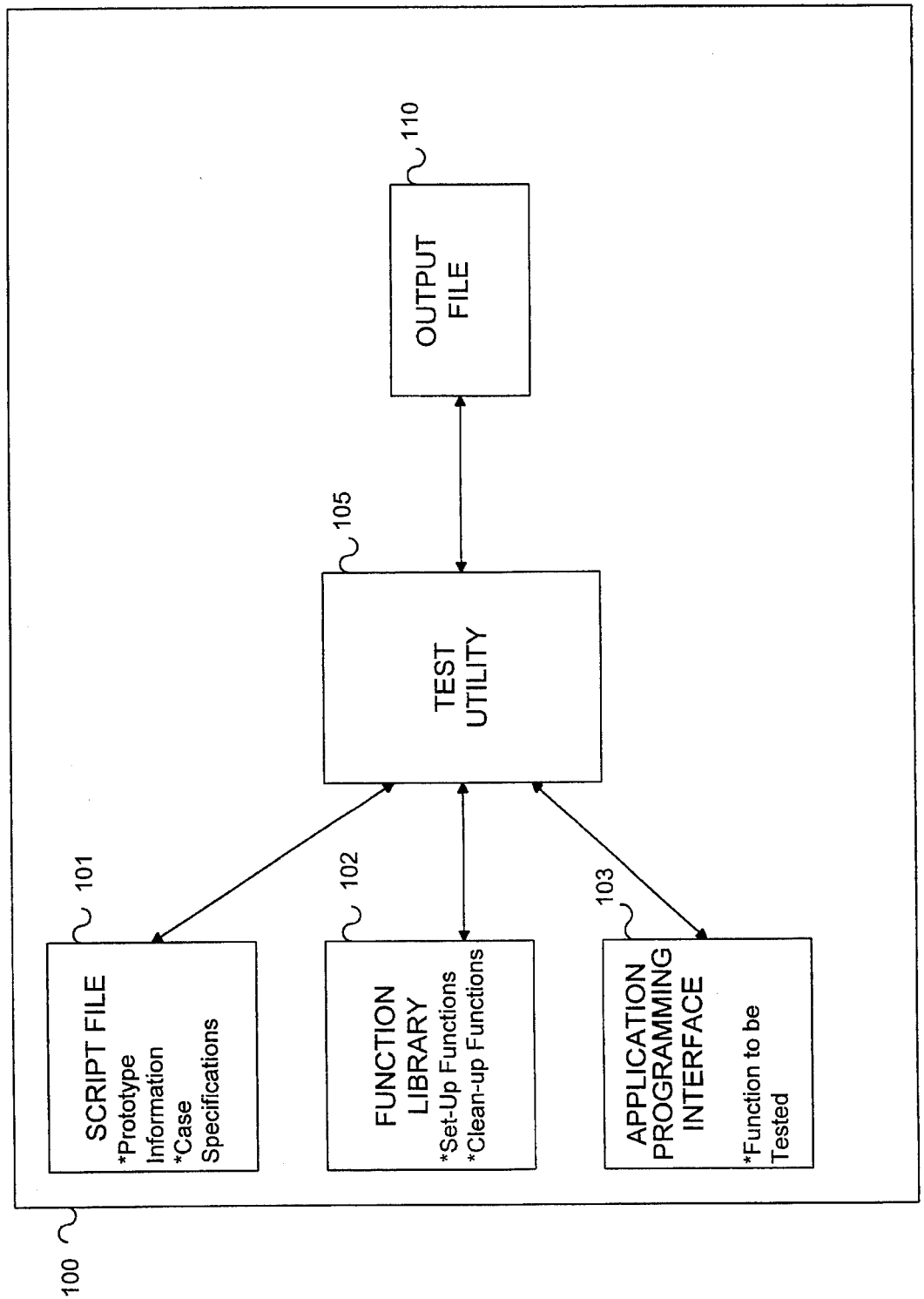
FIG. 1 is a block diagram of the components in a preferred embodiment of the present invention including a computer system, a script file, a function library, a test utility, an application programming interface, and an output file.

FIG. 1 is a block diagram of components in a preferred embodiment of the present invention. The components include a computer system 100, a script file 101, a function library 102, an application programming interface (API) 103, a test utility 105, and an output file 110. Script file 101 contains prototype information about each of the functions in API 103 and is stored in the computer system 100. Prototype information includes a list of parameter names and parameter types associated with each function, along with valid and invalid values for each parameter. Test utility 105 is also stored in the computer system 100. Test utility 105 reads script file 101 and generates one or more test cases for each function. Each test case comprises case names, which are valid or invalid values for each parameter.

After generating the one or more test cases, test utility 105 selects the first test case and then calls appropriate set-up functions for each case name in the selected test case. Set-up functions are stored in function library 102. Set-up functions create a parameter of the type they are for; the parameter being passed back to test utility 105, so that the parameter can be used in a test. For instance, a set-up function for a case name DWORD_ONE_MEG returns a DWORD (double word) that has a value equal to $2^{20}$. Because set-up functions allocate system resources which sometimes need to be freed up after the parameter has been used, function library 102 also contains clean-up functions for each case name.

After setting up parameter values for all of the case names in the selected test case, test utility 105 calls the function being tested and passes the case names in the selected test case to the function. Test utility 105 writes the case names passed to the function and the result of the function to output file 110, and then calls the appropriate clean-up functions to clean up any resources allocated by the set-up functions.

The information in script file 101 and the code in function library 102 are generated and shared by programmers who wish to perform parametric testing. Test utility 105 uses these files to determine which test cases need to be generated to test a particular function. The script file, the function library, the test utility, and the output file are described in detail below.

The Script File. Script file 101 contains an entry for each function to be tested. Each entry comprises prototype information for the function and a case specification for each parameter of the function. The prototype information includes a function type, a function identifier, an expected return value for the function upon failure, and a parameter type and a parameter identifier for each parameter associated with the function. An example of prototype information is as follows:

HANDLE GlobalAlloc (DWORD dwFlags, DWORD dwBytes)=0

The function type is HANDLE, the function identifier is GlobalAlloc, the expected return value for the function upon failure is 0, and the parameter identifiers are dwFlags and dwBytes. Both parameters are of parameter type DWORD.

The case specification for each parameter includes one or more case names wherein each case name corresponds to a valid or an invalid value for the parameter. Table 1 is a sample script file containing one entry for the function GlobalAlloc.

TABLE 1

HANDLE GlobalAlloc(DWORD dwFlags,DWORD dwBytes)=0
    dwFlags:
      valid: DWORD_VALID_GLOBALALLOC_FLAGS
      invalid: DWORD_SPURIOUS_GLOBALALLOC_FLAGS
    dwBytes:
      valid: DWORD_ONE_K
          DWORD_ONE_MEG
      invalid: DWORD_THREE_GIG In Table 1, the first line contains the prototype information for the function GlobalAlloc. Each parameter—dwFlags and dwBytes—has a corresponding case specification which includes one or more case names. For example, the case name DWORD_VALID_GLOBALALLOC_FLAGS is listed as a valid value for the parameter dwFlags, while DWORD_THREE_GIG is listed as an invalid value for the parameter dwBytes. An entry similar to Table 1 exists in the script file for each function to be tested.

Alternatively, the case specification can include one or more case names corresponding to valid values and a keyword that indicates that any case names for that parameter type, which are not listed in the "valid" section should be considered invalid values for that parameter. A list of all of the case names defined for a parameter type can be maintained in a separate file that is accessible by the test utility. For example, suppose there is an entry in script file 101 that reads as follows:

```
BOOL FOOBAR (HWND hWindow) = FALSE
    hWindow:
            valid: HANDLE_ONE, HANDLE_THREE
            omit:
```

Also suppose that parameter type HWND has eight case names defined HANDLE_ONE, HANDLE_TWO, HANDLE_THREE, HANDLE_FOUR, HANDLE_FIVE, HANDLE_SIX, HANDLE_SEVEN, and HANDLE_EIGHT. The above entry for FOOBAR would be the same as the following entry:

```
BOOL FOOBAR (HWND hWINDOW) = FALSE
    hWindow:
            valid:   HANDLE_ONE, HANDLE_THREE
            invalid: HANDLE_TWO, HANDLE_FOUR
                     HANDLE_FIVE, HANDLE_SIX
                     HANDLE_SEVEN, HANDLE_EIGHT
```

Later, when someone else defines case names HANDLE_NINE and HANDLE_TEN, the script entry for FOOBAR will be equivalent to the following entry:

```
BOOL FOOBAR (HWND hWINDOW) = FALSE
    hWindow:
            valid:   HANDLE_ONE, HANDLE_THREE
            invalid: HANDLE_TWO, HANDLE_FOUR
                     HANDLE_FIVE, HANDLE_SIX
                     HANDLE_SEVEN, HANDLE_EIGHT
                     HANDLE_NINE, HANDLE_TEN
```

This way, a programmer can benefit from case names later defined by other programmers. If a case name was listed next to the "omit" keyword, then the test utility would also exclude that case name from use as an invalid value for the parameter hWindow.

The Function Library. Function library 102 contains a set-up and a clean-up function for each parameter type in script file 101. A set-up function creates a value for the parameter type depending upon the case name that is passed to the set-up function. A clean-up function destroys the value created by the set-up function. The naming convention of the set-up and clean-up functions is important-for any parameter type, the corresponding set-up function is <_SETUP, while the corresponding clean-up function is <parameter type>_CLEANUP. Each set-up and clean-up function preferably consist of a large "switch" statement that contains either code for the generation of parameter values, or a function call to a function which performs the generation. Each case in the switch statement corresponds to a case name specified in the script file. If a set-up function allocates a resource, a pointer to the resource or to a structure which contains information about the resource has to be saved so that the corresponding clean-up function can deallocate the resource.

Table 2 is a sample function library containing set-up and clean-up functions.

TABLE 2

```
DWORD DWORD_SETUP (char casename, LPVOID *Pointer,
            HANDLE hLog, HANDLE hConOut)
{
    DWORD dwRet;
    switch (casename) {
        case DWORD_VALID_GLOBALALLOC_FLAGS:
            dwRet = GMEM_PTR;
```

TABLE 2-continued

```
            break;
        case DWORD_ONE_K:
            dwRet = 1024;
            break;
    }
    return (dwRet);
}
HANDLE HANDLE_SETUP (char casename, LPVOID
            *Pointer, HANDLE hLog, HANDLE hConOut)
{
    HANDLE hRet;
    switch (casename) {
        case HANDLE_NONDISCARDABLE_LMEM_
            BLOCK:
            hRet = LMemHandleCreate(hLog, hConOut,
                casename);
            *Pointer = (LPVOID) hRet;
            break;
    }
    return (hRet);
}
HANDLE HANDLE_CLEANUP (char casename, LPVOID
            *Pointer, HANDLE hLog, HANDLE hConOut)
{
    switch (casename) {
        case HANDLE_NONDISCARDABLE_LMEM_
            BLOCK:
            LocalFree ((HANDLE) *Pointer);
            break;
    }
}
DWORD DWORD_CLEANUP (char casename, LPVOID
            *Pointer, HANDLE hLog, HANDLE hConOut)
    Switch {
        case DWORD_VALID_GLOBALALLOC_FLAGS:
            break;
        case DWORD_ONE_K:
            break;
    }
```

The Test Utility. Test utility 105 coordinates the parametric testing of a function. Test utility 105 first reads an entry from the script file that corresponds to the function to be tested. Based on the case names specified for each parameter, test utility 105 generates a plurality of test cases. Each test case comprises a valid or an invalid value for each parameter. For each test case generated, test utility 105 invokes a set-up function for each case name in the test case, invokes the function to be tested by passing the case names in the test case to the function as parameters, records the outcome of the function, and then invokes a clean-up function for each case name in the test case.

To generate the plurality of test cases, the test utility reads the entry in the script file that corresponds to the function being tested. The test utility then makes two lists for each parameter of the function; the first list containing "valid" case names and the second list containing "invalid" case names. The test utility then passes the lists to a recursive subroutine. At each level, the recursive subroutine selects a parameter list and loops through valid and invalid values in the selected parameter list, calling itself and passing all of the lists except the selected parameter list.

After generating all of the test cases, or after each test case is generated, the test utility is ready to test the function. The test utility needs the name of the function being tested, as well as the case names in the test case being used, to pass to the appropriate set-up and clean-up functions. The test utility constructs the names of the appropriate set-up and clean-up functions. For each case name, the test utility constructs the name of the set-up function to be <parameter type>_SETUP. For each case name, the test utility constructs the name of the set-up function to be <parameter type>_

CLEANUP. The test utility will look in the function library for the set-up and clean-up functions. In a preferred embodiment, the test utility locates the appropriate set-up and clean-up functions within the function library by using a routine supplied by Microsoft Windows, called GetProcAddress. GetProcAddress returns the address of a function within the function library.

In a preferred embodiment, all set-up and clean-up functions accept the same number and type of parameters. Additionally, all set-up and clean-up function return DWORD's (double words) because any data type can fit into a DWORD. Therefore, after the test utility receives a pointer to the appropriate set-up or clean-up function from GetProcAddress, the test utility knows exactly what parameters will work for the set-up or clean-up function, and knows what to expect back from the set-up or clean-up function.

The Output File. Output file 110 preferably contains the outcome of the function test along with the test cases passed to the function. Output file 110 enables the programmer that is running the test to quickly find out what the function was doing when a test case fails, without having to look at the source code of the function. Of course, test utility 105 may be modified so that other desired information is written to output file 110.

Figure 2A:
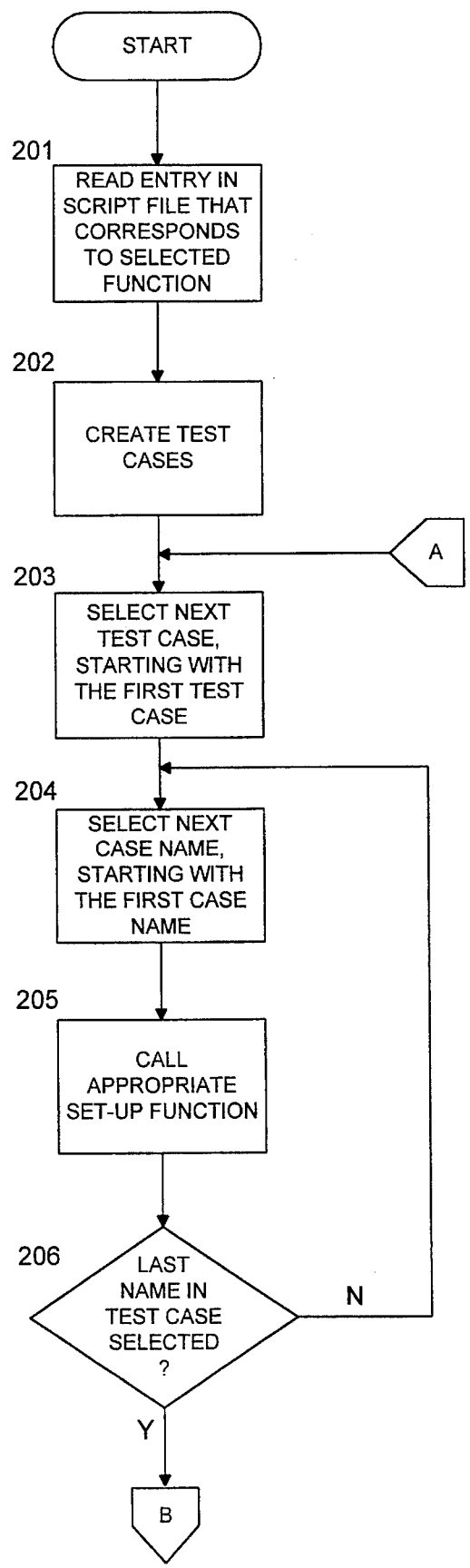
FIGS. 2A through 2C comprise a detailed flow diagram of a method used by the present invention to perform parametric testing of a function.
Figure 2B:
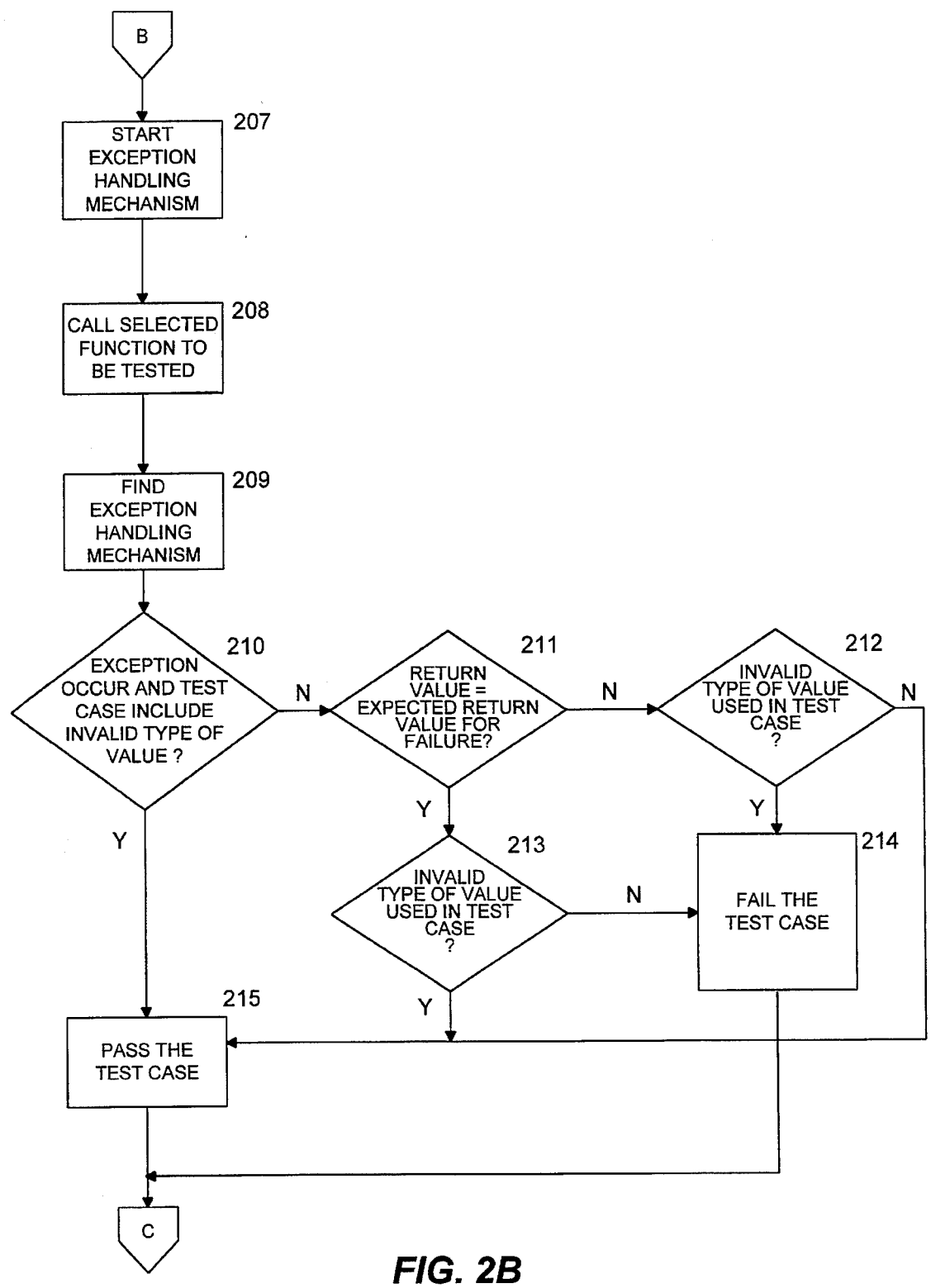
Figure 2C:
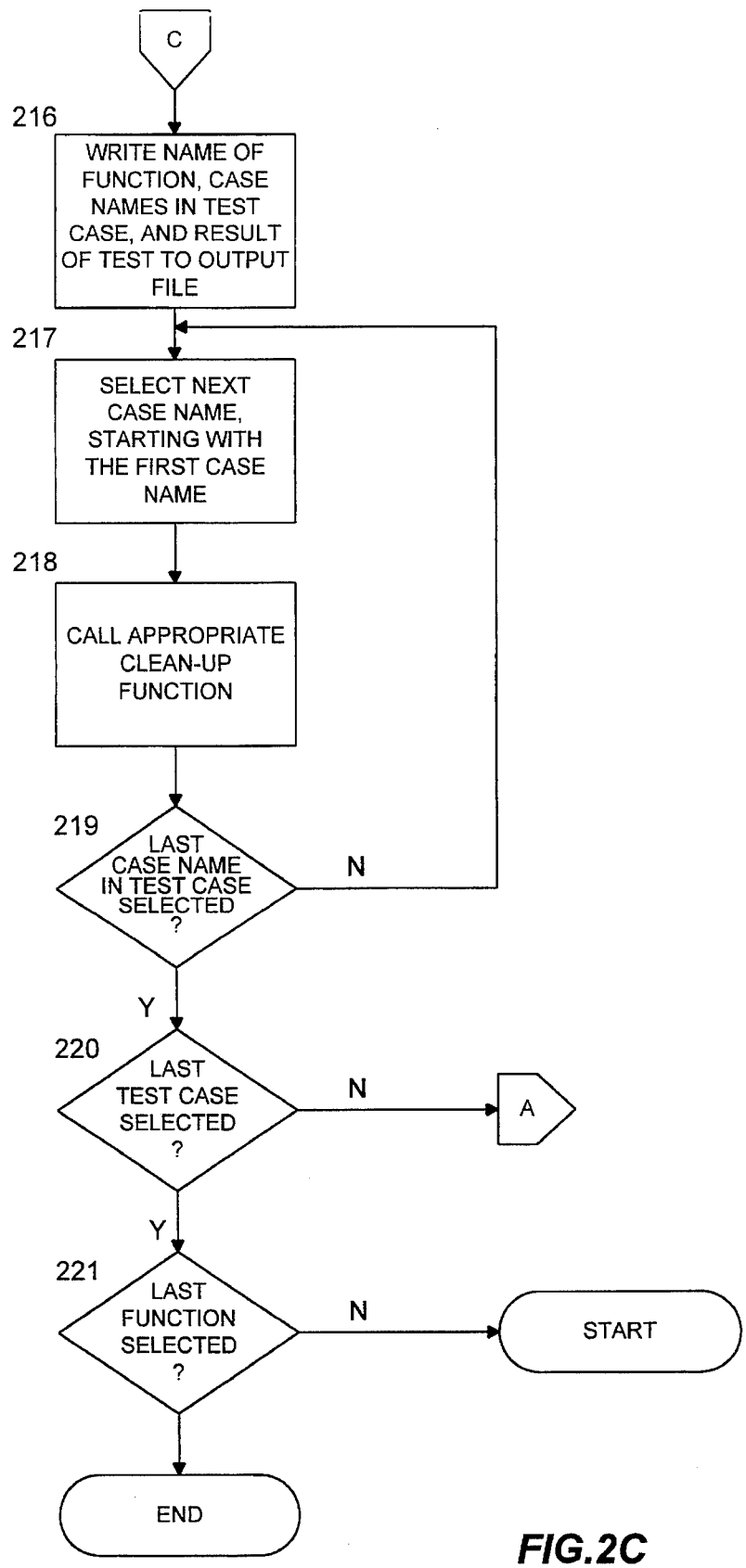

Description of Flowcharts. FIGS. 2A through 2C comprise a detailed flow diagram of the method used by the present invention to perform parametric testing of a function. In a preferred embodiment, test utility 105 selects a function to be tested from a list of functions supplied by a programmer or, alternatively, a programmer invokes test utility 105 to test a single selected function. Referring to FIG. 2A, after a function has been selected, in step 201 the test utility reads the entry in the script file 101 that corresponds to the selected function. As explained above, each entry in the script file comprises prototype information for a function and a case specification for each parameter associated with the function. Each case specification includes one or more case names wherein each case name corresponds to a valid or an invalid value for the parameter.

In step 202, the test utility creates a plurality of test cases based on the case names listed in the case specification for each parameter associated with the function. Each test case includes a case name for each parameter. One of the advantages of the present invention is the ability to perform valid and invalid parameter testing for a function with a minimum of code generation. A programmer testing a function has the option of automatically using case names generated by other programmers. The case names associated with a parameter represent valid and invalid values for the parameter.

In a preferred embodiment, the test utility has the ability to generate test cases for both linear and permutative testing. In general, linear testing results in N test cases being generated, where N equals the sum of the number of case names representing invalid values in each case specification plus 1. Permutative testing results in M test cases being generated, where M is equal to the product of the total number of case names for each parameter. For example, suppose the following entry exists in script file 101:

| INT Multiply (INT a, CHAR b) = 0 | | | |
|---|---|---|---|
| a: valid: | INT_G | | |
| invalid: | INT_B1 | INT_B2 | INT_B3 |
| b: valid: | CHAR_G | | |
| invalid: | CHAR_B1 | CHAR_B2 | CHAR_B3 |

For linear testing, the test utility would generate the following test cases:

| | |
|---|---|
| (INT_G, CHAR_G) | |
| (INT_B1, CHAR_G) | (INT_B2, CHAR_G) |
| (INT_B3, CHAR_G) | |
| (INT_G, CHAR_B1) | (INT_G, CHAR_B2) |
| (INT_G, CHAR_B3) | |

For permutative testing, the test utility would generate the following test cases:

| | | | |
|---|---|---|---|
| (INT_G, CHAR_G) | (INT_G, CHAR_B1) | (INT_G, CHAR_B2) | (INT_G, CHAR_B3) |
| (INT_B1, CHAR_G) | (INT_B1, CHAR_B1) | (INT_B1, CHAR_B2) | (INT_B1, CHAR_B3) |
| (INT_B2, CHAR_G) | (INT_B2, CHAR_B1) | (INT_B2, CHAR_B2) | (INT_B2, CHAR_B3) |
| (INT_B3, CHAR_G) | (INT_B3, CHAR_B1) | (INT_B3, CHAR_B2) | (INT_B3, CHAR_B3) |

After the test utility has created the plurality of test cases, the test utility performs steps 203–220 for each test case. In step 203 of FIG. 2A, the test utility selects the next test case, starting with the first test case generated in step 202. In step 204, the test utility selects the next case name in the selected test case, starting with the first case name. After selecting a case name, in step 205 the test utility calls the appropriate set-up function for the selected case name. As described above, the set-up function contains code to generate an actual value for the case name. Steps 204–206 are performed for each case name in the selected test case to create actual values that are represented by the case names.

Referring to FIG. 2B, in step 207 the test utility starts an exception handling mechanism. An exception, a well-known occurrence in the computer field, is a problem or change in conditions that causes a computer system's microprocessor to stop what it is doing and then find and carry out instructions in a separate routine designed to handle the situation. The exception handling mechanism can be any routine that ensures control is always returned to the test utility. In step 208, the test utility calls the selected function, passing the case names in the selected test case to the function as parameters. After the function has finished executing, in step 209 the test utility ends the exception handling mechanism.

In steps 210–215, the test utility determines whether the selected test case passes or fails. In other words, the test utility determines if the function behaved as expected given the case names in the selected test case.

In step 210, the test utility determines whether an exception has occurred and whether the selected test case includes at least one invalid value. If an exception has occurred and the selected test case includes at least one invalid value, then in step 215 the test utility passes the selected test case. If an exception occurred and all of the case names in the selected test case are valid values, or if an exception did not occur and the selected test case includes at least one invalid value, then the test utility examines the return value of the function in step 211.

In step 211, the test utility checks to see whether the return value of the function being tested equals the expected return value upon failure listed in the prototype information for the function in the script file. In a preferred embodiment, the expected return value upon failure is what the function should return when an invalid value is passed to the function. If the return value equals the expected return value upon failure, then in step 213 the test utility determines whether the selected test case includes an invalid value. If the selected test case does include an invalid value, then in step 215 the test utility passes the selected test case. If the selected test case includes all valid case names, then in step 214 the test utility fails the selected test case.

Referring back to step 211, if the return value is not equal to the expected return value upon failure, then in step 212 the test utility determines whether the selected test case includes an invalid value. If the selected test case includes an invalid value, then the test utility fails the selected test case in step 214. If the selected test case does not include an invalid value, then the test utility passes the selected test case in step 215.

In summary, if a case name that represents an invalid value is used in a test case, either an exception should occur or the function should return its expected return value upon failure. If a test case includes all case names that represent valid values, then an exception should not occur and the function should perform as expected.

In step 216 of FIG. 2C, the test utility preferably writes the name of the selected function, the case names in the selected test case, and whether the selected test case passes or fails, to the output file. In steps 217-219, the test utility calls the appropriate clean-up functions for each of the case names in the selected test case. As described above, the clean-up functions clean up any resources allocated by the set-up functions. In step 220, the test utility determines whether all of the test cases have been selected. If not, the test utility selects the next test case in step 203 of FIG. 2A. If all of the test cases have been selected, the test utility has completed the process.

Although the methods and systems of the present invention have been described in terms of a preferred embodiment, it is not intended that the invention be limited to this embodiment. Modifications within the spirit of the invention will be apparent to those skilled in the art. The scope of the present invention is defined only by the claims that follow.

We claim:

1. A computer system for automatically testing a selected function, wherein the selected function receives parameters as input and returns a result, each parameter having a type, the result indicating whether the selected function detected an error, the computer system comprising:

a script file having a list of values for each parameter of the selected function, each value being designated as valid or invalid;

a function library having a set-up function for each type of parameter, each set-up function for creating a variable of the type and for initializing the created variable with a passed value; and a test utility for retrieving the list of values from the script file, for invoking the set-up function for the type of each parameter passing a value from the list of values for the parameter, for invoking the selected function passing the variables created by the set-up functions, and for determining whether the result of the selected function is consistent with the validity or invalidity of the values of the passed variables.

2. The computer system of claim 1 wherein the function library comprises a clean-up function for each type of parameter, each clean-up function for destroying a variable created by a corresponding set-up function, including the step of after invoking the selected function, invoking the clean-up functions corresponding to the invoked set-up functions.

3. A method of testing a function in a computer system, wherein one or more parameters are passed to the function, the function having a result, the computer system having a script file containing information for identifying the function and for identifying valid and invalid values for each of the parameters passed to the function, the computer system having a function library containing instructions for directing the computer system to create and destroy the valid and invalid values identified in the script file, the method comprising the steps of:

generating one or more test cases, wherein each test case comprises one of the valid or invalid values identified in the script file for each of the parameters of the function; and for each test case, executing the instructions in the function library to create the valid or invalid values in the test case;

invoking the function, wherein created valid or invalid values in the test case are passed to the function as parameters;

recording the result of invoking the function with the passed valid or invalid parameters, wherein a determination can be made as to whether the recorded result is a correct result based on the passed parameters: and executing the instructions in the function library to destroy the valid or invalid values in the test case.

4. A method of testing the integrity of a function in a computer system, the function being associated with a set of parameters which are passed to the function by the computer system when the function is invoked, the method comprising the steps of:

(a) providing a script file containing prototype information for the function and a case specification for each parameter associated with the function, the prototype information including a type identifier to identify the type of function, and parameter information for identifying the parameters associated with the function by type and name, and the case specification including a case name for identifying a valid value for the parameter or a case name for identifying an invalid value for the parameter;

(b) providing a function library containing a set-up function for creating valid and invalid values and a clean-up function for destroying the valid and invalid values created by the set-up functions for each case name in the script file;

(c) creating a plurality of unique test cases for the function, wherein each test case comprises a combination of the case names identified in the script file such that each case name corresponds to one of the parameters associated with the function;

(d) for each test case, invoking the set-up function for each case name in the test case;

invoking the function while passing the case names in the test case to the function as parameters;

determining whether the test case passes or fails;

invoking the clean-up function for each case name in the test case; and recording the outcome of invoking the function in an output file.

5. The method of claim 4 wherein the step of creating a plurality of unique test cases for the function includes creating N test cases where N equals the sum of the number of case names which correspond to an invalid value plus one.

6. The method of claim 4 wherein the step of creating a plurality of unique test cases for the function includes creating N test cases where N equals the product of the number of case names in each case specification.

7. The method of claim 4 wherein the step of determining whether the test case passes or fails includes the steps of:

passing the test case when an exception occurs and one of the case names passed to the function corresponds to an invalid value;

failing the test case when an exception occurs and all of the case names passed to the function correspond to valid values; and failing the test case when an exception does not occur and one of the case names passed to the function corresponds to an invalid value.

8. The method of claim 4 wherein the script file contains an expected fail value for the function and the step of determining whether the test case passes or fails includes the steps of:

passing the test case when an exception occurs and one of the case names passed to the function corresponds to an invalid value;

passing the test case when an exception does not occur, the function returns an expected fail value, and one of the case names passed to the function corresponds to an invalid value;

failing the test case when all of the case names passed to the function correspond to valid values and the function returns an expected fail value; and failing the test case when an exception does not occur, the function does not return an expected fail value, and one of the case names passed to the function corresponds to an invalid value.

9. A method in a computer system for testing a test function, the test function having formal parameters and a result, each formal parameter having an associated type, the method comprising the computer-implemented steps of:

receiving possible values as actual parameters for each formal parmeter and a designation that each possible value is valid or invalid;

for each formal parameter, selecting a possible value and invoking a set-up function for creating a variable of the associated type, and for setting the variable to the selected possible value;

invoking the test function passing the created variables as actual parmeters; and determining whether the result of the invoked test function correctly indicates the validity or invalidity of the value of the actual parmeters in accordance with the received designation.

10. The method of claim 9 including the step of, for each formal parameter, destroying the created variable.

11. The method of claim 9 including the step of repeating the steps of invoking the test function and determining whether the result of the invoked test function correctly indicates for various combinations of possible value for the actual parameters.

12. The method of claim 11 wherein the various combinations are linear combinations.

13. The method of claim 11 wherein the various combinations are permutative combinations.

14. The method of claim 11 including the step of outputting the values of the actual parameters, the result of the invoked test function, and the determined indication.

* * * * *